(12) United States Patent
Sidhwa et al.

(10) Patent No.: US 7,775,168 B2
(45) Date of Patent: Aug. 17, 2010

(54) APPARATUS AND METHOD FOR THE INJECTION OF VISCOUS FERTILIZER BELOW THE SURFACE OF THE SOIL

(75) Inventors: Phil Sidhwa, Oakville (CA); Dan Goldhawk, Brantford (CA); Walter Stewart Grose, Alma (CA); Gordon Raymond Grose, Alma (CA)

(73) Assignee: American Water Works Company, Inc., Voorhees, NJ (US)

( * ) Notice: Subject to any disclaimer, the term of this patent is extended or adjusted under 35 U.S.C. 154(b) by 870 days.

(21) Appl. No.: 11/410,811

(22) Filed: Apr. 24, 2006

(65) Prior Publication Data

US 2007/0245936 A1  Oct. 25, 2007

(51) Int. Cl.
| A01C 23/00 | (2006.01) |
| A01C 5/00  | (2006.01) |
| A01C 7/00  | (2006.01) |
| A01C 9/00  | (2006.01) |
| A01G 25/09 | (2006.01) |
| E01C 19/16 | (2006.01) |
| E01H 3/02  | (2006.01) |

(52) U.S. Cl. .................. 111/118; 111/127; 111/128; 111/163; 111/187; 239/172

(58) Field of Classification Search ............. 111/118, 111/120, 121, 122, 123, 124, 127, 128, 137, 111/155, 156, 163, 169, 187, 925, 73; 137/625.15, 137/561 A, 565.34, 627; 210/178, 181, 182, 210/195.1, 202, 205, 259, 266, 319; 239/172, 239/650, 655, 663, 676, 680, 682, 689; 222/397, 222/400.5, 61, 627
See application file for complete search history.

(56) References Cited

U.S. PATENT DOCUMENTS

| 3,581,685 A | * | 6/1971  | Taylor .................. 111/124 |
| 3,926,377 A |   | 12/1975 | Johnson |
| 3,944,143 A |   | 3/1976  | O'Reilly et al. |
| 3,945,332 A |   | 3/1976  | Wirsbinski |
| 4,515,311 A |   | 5/1985  | Takata |
| 4,592,294 A |   | 6/1986  | Dietrich et al. |
| 4,616,579 A |   | 10/1986 | Solt |
| 4,649,836 A |   | 3/1987  | Overocker |
| 5,190,649 A |   | 3/1993  | Celi |
| 5,271,567 A |   | 12/1993 | Bauer |
| 5,487,346 A | * | 1/1996  | Taylor .................. 111/127 |
| 5,590,611 A | * | 1/1997  | Smith .................. 111/127 |
| 5,641,529 A | * | 6/1997  | Kunas .................. 426/516 |
| 5,682,829 A |   | 11/1997 | Sukop |
| 5,685,461 A | * | 11/1997 | Mitchell ................ 222/184 |

(Continued)

OTHER PUBLICATIONS

PCT International Search Report from PCT/US06/15633 dated Jun. 17, 2008.

(Continued)

*Primary Examiner*—Jerry Lorengo
*Assistant Examiner*—Jennifer A Smith
(74) *Attorney, Agent, or Firm*—Dechert LLP

(57) ABSTRACT

The invention pertains to apparatus and methods for injecting viscous fertilizer, such as dewatered biosolids, below the surface of the soil. The invention also pertains to apparatus and methods for creating a continuous flow of viscous material and for dividing a flow of viscous material.

12 Claims, 8 Drawing Sheets

U.S. PATENT DOCUMENTS

| | | | |
|---|---|---|---|
| 5,865,131 | A | 2/1999 | Dietrich et al. |
| 6,973,884 | B2 | 12/2005 | Dietrich |
| 2002/0117095 | A1* | 8/2002 | Allan et al. ............... 111/124 |
| 2004/0235406 | A1 | 11/2004 | Duescher |
| 2004/0256502 | A1* | 12/2004 | Niemela et al. ............ 239/650 |
| 2006/0042526 | A1 | 3/2006 | McLeod |
| 2006/0042703 | A1 | 3/2006 | Huffman |

OTHER PUBLICATIONS

PCT Written Opinion of the International Searching Authority from PCT/US06/15633 dated Jun. 17, 2008.

Janiec, Mark et al., "Dewatered Biosolids Injection Equipment," *Proceedings of the 3rd Canadian Organic Residuals Recycling Conference*, Calgary AB, Jun. 1-4, 2005.

Advertisement, 2005, "The Nuhn Advanatage," *Manure Manager Magazine*, Jan.-Feb. 2005, p. 7.

Advertisement, 2005, "Vogelsang, Sludge Pump Division Makes Manure Make Money," *Manure Manager Magazine*, Jan.-Feb. 2005, p. 21.

Advertisement, 2005, "Husky—We Meet All Your Liquid Manure Needs" *Manure Manager Magazine*, Jan.-Feb. 2005, p. 28.

Advertisement, 2005, "Terragator Nutrient Management System," *Manure Manager Magazine*, Jan.-Feb. 2005, p. 31.

Advertisement, 2005, "The GL2000 Liquid Flow Control System," *Manure Manager Magazine*, Jan.-Feb. 2005, p. 33.

Advertisement, 2005, "Farmstar® Liquid Manure Direct Injection," *Manure Manager Magazine*, Jan.-Feb. 2005, p. 36.

Advertisement, 2005, "Hydro Engineering—The World Leader Brings You the Most Available & Affordable Drag Hose System Available Today," *Manure Manager Magazine*, Jan.-Feb. 2005, p. 40.

Landry, 2005, "PAMI Unveils Prototype Solid Manure Injector," *Farmscape for Oct. 26, 2005, Episode 149*, http://farmscape.com/f2ShowScript.aspx?i-218....

No author available, 2005, "Solid Manure Injection a Reality Soon," *Farmscape* Article 1878-Aug. 6, 2005, http://farmscape.com/f2ShowScript.aspx?i=-21757&q=Solid+....

No author available, "2000 Series ProPush® Box Spreaders," Product information available at http://kuhnknight.com/kuhnknight/products/propush.htm.

Chen, "Liquid Manure Application Techniques to Minimize Odours," http://www.gov.mb.ca/agriculture/livestock/livestockopt/presentations/chen.pdf, slide presentation Mar. 18, 2003.

Chen, "Liquid Manure Application Techniques to Minimize Odours," date of article unknown.

Chambers et al., "Spreading Systems for Slurries and Solid Manures," Publication from ADAS, IGER and Silsoe Research Institute, date of booklet unknown.

MacDonald, Editor, 2005, "Innovations Manure Injection Systems," *Manure Manager Magazine*, Jan.-Feb. 2005, pp. 26-31.

Muse et al., 1991, "Land Application of Sludge," *Environmental Quality Agriculture & Natural Resources*, http://aces.edu/crd/publications/ANR-607.html.

1998, "Methods of Applying Biosolids," U.S. EPA Report available at http://nps. gov/plants/restore/pubs/biosolids/application.htm.

1998, Emission Factor Documentation for AP-42, Section 9.2.1, Fertilizer Application Draft Report by the U.S. EPA Jun. 1998.

\* cited by examiner

APPARATUS AND METHOD FOR THE INJECTION OF VISCOUS FERTILIZER BELOW THE SURFACE OF THE SOIL

1. FIELD OF THE INVENTION

This invention relates to agricultural equipment. The subject matter involves apparatus and methods for injecting viscous fertilizers, including but not limited to dewatered biosolids, semisolid manure, and viscous fertilizers and soil amenders, below the surface of the soil. The subject matter also involves apparatus and methods for creating a continuous flow of viscous material and for dividing a flow of viscous material.

2. BACKGROUND

Fluid agricultural fertilizers include manure, sewerage and septage and chemical fertilizers with a solids content under about 13 percent by weight. Application of such fluid fertilizers may be done by flood irrigation, aerial spraying, irrigation sprayers, mobile surface sprayers (tank-type or drag hose type, either of which may incorporate tillers to incorporate the liquid into the soil), and fluid injectors. Fluid injector applicators typically use a shank to loosen and create voids in the soil so that the liquid fertilizer may be injected into the soil immediately behind the shank. Gaseous anhydrous ammonia may be injected in the same fashion. These systems can leave fluid at the surface if the voids created below the surface are not large enough to accept the volume of fluid injected.

Fluid agricultural fertilizer application methods have many disadvantages, both in cost and effectiveness. Flood irrigation, aerial spraying, and irrigation sprayers have significant costs and are limited by the configuration or topography of the fields. Liquid manure or treated sewerage fertilizer may produce significant malodors. Mobile surface spraying and fluid injectors are costly because they require large volumes of liquid to be transported to the application site, and the volume of fluid to be applied limits the amount of solid nutrients which may be applied at one time. Tank surface sprayers cause soil compaction and high fuel costs due to the weight of the fluid necessarily carried. Drag hose surface spraying is often impractical on sloped or irregularly-shaped fields. As the solid content of fluid agricultural fertilizer increases, fluid application systems become prone to malfunctions and may require special pumps. Fluid systems may also require agitation to keep solids in suspension. Mobile spraying applications often require tilling to incorporate the fertilizer into the soil and to reduce malodors. Fluid injection applicators, such as that described in U.S. Pat. No. 5,865,131 (Dietrich), have been developed to place the liquid below the surface and reduce the need for tilling, but many of the problems of fluid application methods remain: large volumes of fluid to transport, limited amounts of nutrients which may be applied at one time, soil compaction, and difficulty accepting higher solid content. For treated sewerage, environmental regulations often limit where fluids may be applied because of malodors or the potential for the fluid to migrate to watercourses.

Conventional fluid injection systems are not generally adapted for the injection of high-pressure fluids. Such systems, with a tubular injector mounted behind a shank, are also not adaptable to the application of viscous fertilizers, in part because sufficient void space is not maintained below the surface of the soil to accept the viscous fertilizer, in part because they do not operate at high enough pressure, and in part because the equipment may not be adapted to the solids content of viscous fertilizers.

Between about 13-40% solid content by weight, fertilizers, soil amenders, and soil conditioners are viscous, and the term "viscous fertilizer" in this disclosure includes such a range of solid content. However, the apparatus and methods described are effective on a wider range of materials, and the term "viscous fertilizer" as used in this disclosure also refers to fertilizers, soil amenders, and soil conditioners with a solid content falling within a range whose lower limit is from 0% to 40% and whose upper limit both is above the lower limit and is from 13% to 52%. "Viscous fertilizers" include, but are not limited to, biosolids, dewatered biosolids, sewage sludge, manure, slurries, or other chemical or mineral fertilizers in the 0-52% solid content range.

Viscous fertilizers above about 13% solid content have traditionally been applied by manure spreaders that involve an open-topped hopper, a conveying mechanism (e.g., augers, a conveyor belt floor, a live bottom floor, a walking floor, an apron chain, or a push blade) which conveys the viscous fertilizer to an open end or side of the hopper where rotating tines fling the material into the air, from which it falls onto the surface of the ground. A second pass over the application area is often required to till the material into the soil and to mitigate malodors. Such viscous fertilizers may also be applied in bulk and then spread with earthmoving equipment. All these methods may result in uneven application of the viscous fertilizer and repeated and costly reworking of the soil.

Fertilizers, soil amenders, and soil conditioners with higher solids contents may be applied as are viscous fertilizers. They may also be supplied in granular or pellet form, in which case they may be applied with a centrifugal spreader.

The use of biosolids for fertilization, soil amendment, and/or soil conditioning presents particular problems. At a sewerage treatment plant, for example, biosolids are found in sewerage at only a few percent solid content by weight. However, the cost of transporting the great quantities of such fluid required and the difficulties in the agricultural application of such a fluid to the soil generally make it more efficient to dewater the biosolids before their use in agriculture.

3. SUMMARY

The present invention resolves many of the problems with traditional agricultural application of fluids and viscous fertilizers by providing, in various aspects and embodiments, apparatus and methods for injecting viscous fertilizer below the surface of the soil. Compared to mobile surface spraying of fluids, the invention generally requires less material to be transported to the site of application (i.e., less water) and causes less soil compaction from the weight of a fluid tank. As compared to application of fluid fertilizers, the invention generally allows higher concentrations of nutrients to be applied at one time due to the higher nutrient concentration of the viscous fertilizer, relaxation of limitations on the amount of fluid fertilizer that can be applied to the soil at any one time, and broader implementation while complying with nutrient management regulations and clean water regulations. The invention presents fewer malodor problems because the viscous fertilizer is injected underground and is not sprayed through the air and onto the soil surface. The invention permits viscous fertilizer to be applied in places where regulatory and environmental concerns would not permit fluid biosolids to be applied due to runoff and malodor concerns. Compared to traditional methods of applying of solid and viscous fertilizers, the injection of viscous fertilizer below the surface of the soil eliminates the need to make a second pass over the field to till the material into the soil, and offers advantages with respect to malodors, uniformity of application, and regulatory and environmental concerns.

To permit injection of viscous fertilizer below the surface of the soil, the invention provides for the delivery of viscous fertilizer under pressure to an injection mechanism which places the viscous fertilizer below the surface of the soil. The viscous material is pressurized and movement motivated by a pump, which in some embodiments is a positive displacement, rotary lobe pump. The invention further provides for the conveyance of viscous fertilizer to this pump in a continuous manner, so as to allow the injection of viscous fertilizer to be uniform. In some embodiments, a proportioner permits the viscous fertilizer to be proportioned among multiple injectors so as to speed the injection process.

In one embodiment, the invention comprises a trailer-mounted open top container box for receiving and holding the viscous fertilizer. A hydraulically operated push blade pushes the viscous fertilizer rearward against a third side wall of the container having an outlet. In one such embodiment, particularly suitable for dewatered biosolids injection, the outlet is 6 inches high and 9 inches wide. The third side wall usefully has facets angled so as to help direct the viscous fertilizer through the outlet hole to the pump, which is usefully also mounted on or otherwise carried on the trailer. In this embodiment, the pump is preferably powered by a power take-off shaft. The pressurized viscous fertilizer exiting the pump in turn enters a proportioner, usefully also mounted on or otherwise carried on the trailer, which in some embodiments divides the flow; in one embodiment, into 9 divisions. The streams are directed into a delivery system comprising flexible hoses and/or pipes adapted to hold pressurized material from each flow division. The hoses direct the pressurized viscous fertilizer to an injection mechanism, which in some embodiments is also mounted on the trailer and additionally supported by gauge wheels.

In operation of this embodiment, a vehicle, such as a tractor, pulls the trailer forward. In the injection mechanism, a coulter for each division cuts vertically through any stubble into the soil, followed by shanks with sweep points which create voids under the soil. The voids are maintained under extension plates mounted behind the sweep points. Tubular injectors mounted in the extension plates allow pressurized viscous fertilizer that enters the tubular injectors to be expelled into the void, which closes over the injected viscous fertilizer as the injection mechanism passes. In another embodiment, the coulters may be omitted.

The depth of the injection, preferably 3 to 6 inches below the surface of the soil, is adjustable in certain embodiments by adjusting the height of a strut onto which the gauge wheels are mounted.

For a given pump speed, the speed of the vehicle will determine the rate of viscous fertilizer injection per unit area of soil surface (e.g., tons per acre). This rate may be further adjusted to accommodate the solids content of the viscous fertilizer to yield a desired amount of solid material injected per unit area of soil surface. For a given pump speed and vehicle speed, the push blade speed is typically adjusted to be slower than a speed that would push the viscous fertilizer faster than the pump can accept it (eventually causing the viscous fertilizer to spill out of the top of the box) and faster than a speed that allows the pump to accept viscous fertilizer through the outlet hole of the container box faster than the push blade supplies it to the outlet hole (eventually causing the level of viscous fertilizer adjacent to the outlet hole to fall to the point where air can enter the outlet hole and the pump, causing uneven injection and possibly causing the pump to stop). Although an adjustable push blade speed is not required, such adjustment permits a wider range of vehicle speeds to be used in operation.

4. BRIEF DESCRIPTION OF THE FIGURES

The above and other objects and advantages of the present invention will be apparent upon consideration of the following detailed description, taken in conjunction with the accompanying drawings, in which like reference characters refer to like parts throughout, and in which:

FIG. 1 is a left side view of an exemplary embodiment of apparatus 100, operably linked to an exemplary leading vehicle 803, for injecting viscous fertilizer 201 below the surface of the soil 101. FIG. 1 further depicts container box 200, pump 400, proportioner 500, delivery system 600, and injection mechanism 700.

FIG. 2 is a partial cutaway perspective view of an exemplary embodiment of container box 200, looking from above, in front of and to the left side of container box 200. For clarity, left wall 203 is omitted, as are portions of this embodiment which are located outside container box 200, and viscous fertilizer 201.

FIG. 3 is a perspective view of a portion of container box 200, pump 400, proportioner 500, a portion of delivery system 600, and a portion of injection mechanism 700 of an exemplary embodiment of the apparatus, viewed from the left rear side of the embodiment. Portions of the delivery system 600 and injection mechanism 700 have been omitted for clarity.

FIGS. 7a through 7e are views of different embodiments of top plate 506 of cylindrical chamber 501 of proportioner 500.

5. DETAILED DESCRIPTION

Figure 1:
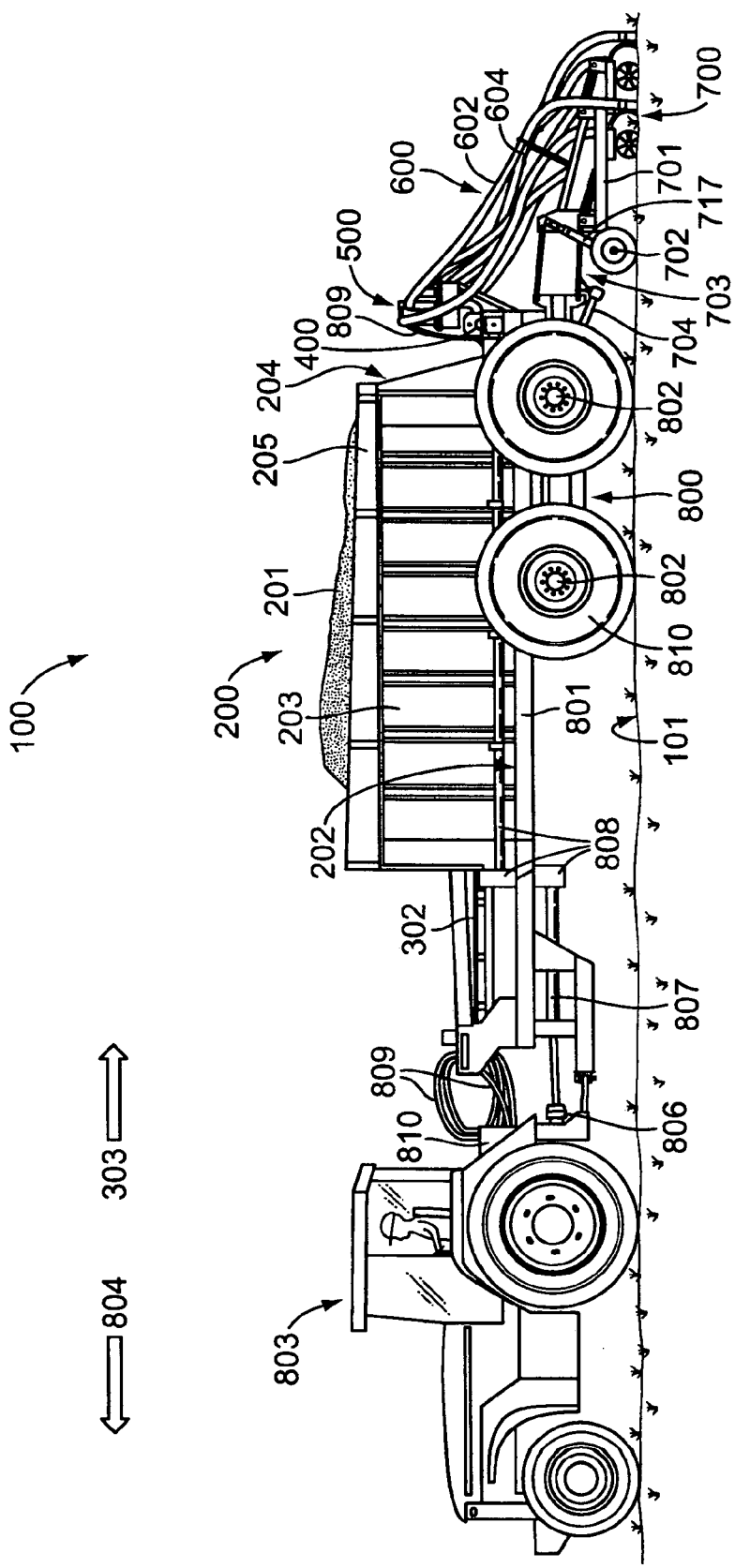

FIG. 1 depicts an embodiment of apparatus 100 for injecting viscous fertilizer 201 below the surface of the soil 101, operably linked to leading vehicle 803. The embodiment comprises trailer 800. The trailer comprises frame 801 and two left wheels 802 mounted astride the left side of the frame in tandem and two right wheels similarly mounted astride the right side of the frame. These wheels have balloon tires 810 whose relatively large area of contact with the surface of the soil 101 minimizes the amount of soil compaction. In operation, trailer 800 is connected to leading vehicle 803 for towing the apparatus in forward direction 804, which is opposite rearward direction 303. In an exemplary embodiment, leading vehicle 803 is a tractor, but in other embodiments, trailer 800 may be towed by a truck or other vehicle type, or the apparatus may be self-propelled. In still other embodiments, trailer 800 may be supported by different arrangements of wheels with different tires or no tires, or skids.

In still another embodiment, proportioner 500, delivery system 600, and injection mechanism 700 are mounted on trailer 800 or a self-propelled vehicle, while the container box 200, conveying apparatus 300, and pump 400 are not, and the viscous fertilizer moves from the pump to the proportioner through drag hose comprising a length of flexible hose which may drag on the ground. Such an embodiment may include one or more booster pumps between pump 400 and injection mechanism 700.

In yet another embodiment, pump 400, proportioner 500, delivery system 600, and injection mechanism 700 are mounted on trailer 800 or self-propelled vehicle, while container box 200 and conveying apparatus 300 are not, and viscous fertilizer 201 moves from container box 200 to pump 400 through drag hose comprising a length of flexible hose which may drag on the ground. Such an embodiment may include one or more additional pumps between container box 200 and pump 400.

In a typical embodiment of the present invention, trailer 800 is operably linked to leading vehicle 803, which vehicle usefully comprises power take off shaft 806 which provides power pump 400 and hydraulic pump 810 which provides power to hydraulic cylinder 302, proportioner 500, and hydraulic cylinder 704. In other embodiments, any component requiring power may be powered by another power source, such as a hydraulic pump, a power take off mechanism, an engine, electricity, or others. In still other embodiments, any such power source may be integrated with the component requiring the power or may be located on leading vehicle 803, on trailer 800, on a self-propelled vehicle, or elsewhere.

In the embodiment depicted in FIG. 1, power take off shaft 806 is usefully in operable communication with a similar power take off shaft 807 on trailer 800, which is in turn connected through a series of gears and shafts 808 rearward along the longitudinal centerline of trailer 800, up to the level of floor 202 of container box 200, transversely to the outside edge of left side wall 203 of container box 200, rear along the outside of left side wall 203 to a point behind third side wall 204 of container box 200, and then transversely toward the longitudinal centerline of trailer 800 where it is in communication with the shaft of the pump 400, thus powering pump 400. In other embodiments, the power take off shaft 807 and gears and shafts 808 may be routed differently to pump 400, the source of the power supplied by the power take off may be different, or pump 400 may be powered hydraulically, electrically, or directly by an engine.

Leading vehicle 803 may usefully comprise hydraulic pump 810 which is operably connected via hydraulic hoses 809 to (i) hydraulic cylinder 302 operating push blade 301 (shown in FIG. 2), (ii) hydraulic motor 504 operating proportioner 500 (shown in FIG. 3), and (iii) hydraulic cylinders 704 operating parallel linkage 703. Usefully, the speed of the hydraulic cylinder 302 is adjustable by the vehicle operator. In other embodiments, the hydraulic pump may be located elsewhere, such as on trailer 800 or on a self-propelled vehicle, or any of the items powered by hydraulics might be powered differently, such as electrically, by a power take off apparatus, or directly by an engine. In other embodiments, push blade 301 may be driven mechanically, including chain-driven or by gears.

In some embodiments, container box 200 for containing viscous fertilizer 201 is mounted to and above trailer frame 801. Container box 200 comprises floor 202, left side wall 203, right side wall 206 (shown in FIG. 2), and third side wall 204. Side wall extensions 205 slope up toward the front of container box 200 to help prevent viscous fertilizer 201 from escaping from the open top of container box 200. In other embodiments, the interior of container box 200 need not be in the shape of a parallelepiped, but may be in the shape of a prism, cylinder, or a combination of portions of a prism or cylinder. Third side wall 204 need not be toward the rear 303 of container box 200, but may instead face any direction. In other embodiments, container 200 box has a cover but is adapted so that the cover may be opened to permit the introduction of viscous fertilizer 201 into container box 200. In yet other embodiments, the cover is not so adapted, but another mechanism for introducing viscous fertilizer (such as an inlet port through a side wall or a cover, or a partial cover, or mechanism for removal of the push blade from the container box) is included to permit the introduction of viscous fertilizer into container box 200. In still other embodiments, no side wall extensions 205, no third side wall extension 207, and/or no push blade extension 304 are present.

In still other embodiments, various other mechanisms may be used to convey viscous fertilizer 201 to pump 400. These may include containers or hoppers which feed pump 400 by gravity or by a combination of gravity and vibration of viscous fertilizer 201, pre-stage pumps, augers, apron chains, or floor 202 comprising a conveyor belt, live bottom, or walking floor mechanism.

In a typical embodiment, pump 400 and proportioner 500 are mounted to trailer frame 801 rearward of third side wall 204. Proportioner 500 has at least one outlet port 507, typically a plurality of outlet ports 507, in some embodiment nine outlet ports 507 (shown in FIG. 6), which are in communication with pipes 503. Attached to pipes 503 is delivery system 600, typically adapted to receive viscous fertilizer 201 from each of pipes 503. In one embodiment, delivery system 600 comprises nine fittings 601 (shown in FIG. 3), nine flexible hoses 602, and two support frames 604 to keep hoses 602 from collapsing or kinking. In other embodiments, the number of outlet ports, pipes, and flexible hoses may be more or less. In another embodiment, proportioner 500 may be omitted and the flow of pressurized viscous fertilizer leaving pump 400 may be divided into multiple divisions through one or more branches in piping, flexible hosing, or other conduit between the pump 400 and the injection mechanism 700. In still another embodiment, proportioner 500 is omitted and pressurized viscous fertilizer 201 is not divided; instead, viscous fertilizer 201 is injected below the surface of the soil at a single point.

Mounted behind and below trailer frame 801 in a typical embodiment is injection mechanism 700 comprising injector frame 701 oriented roughly parallel to the surface of the soil and extending in a traverse direction from the longitudinal axis of trailer frame 801. Plow frame 701 extends a distance, typically at least one foot, in a transverse direction beyond left trailer tires 802 and beyond the right trailer tires. In other embodiments, injector frame 701 may be shaped differently and may be of a shorter or longer extent in a traverse direction from the longitudinal axis of trailer frame 801. In still other embodiments, the injector frame may be omitted and the remainder of the injection mechanism 700 may be mounted to trailer frame 801.

Usefully, an adjustable mounting apparatus, such as parallel linkage 703, connects the rear of trailer frame 801 and the front end of injector frame 701 such that hydraulic cylinders 704 may be actuated to raise injection mechanism 700, or hydraulic cylinders 704 may be disengaged allowing injection mechanism 700 to engage the soil. In other embodiments, the number of hydraulic cylinders may vary. This is useful to permit apparatus 100 to be moved over surfaces (e.g., roads) without disturbing the surface or damaging injection mechanism 700. In still other embodiments, an adjustable mounting apparatus may be omitted, or another type of apparatus for disengaging injection apparatus 700 from the surface of the soil (such as a hinging or folding of injector frame 701) may be used.

In typical embodiments, at least one, typically two, on occasion more, gauge wheels 702, typically with tires, support injector frame 701 when hydraulic cylinders 704 is disengaged. In the embodiment depicted in FIG. 1, two gauge wheels 702 are coaxially mounted to strut 717 immediately in front of the left side of injector frame 701. Gauge wheels are similarly mounted to the right side of injector frame 701. One or more of the gauge wheels, which may number more or less than the four described, may also be mounted inboard or outboard of injector frame 701 and may not be coaxial. Usefully, gauge wheels 702 support injector frame 701 and allow adjustment of the vertical distance between gauge wheels 702 axle and injector frame 701, thus permitting adjustment of the depth that viscous fertilizer 201 is injected below the surface of the soil 101 In other embodiments, injector frame 701 may be supported by different arrangements of wheels with different tires or no tires, or skids. In yet other embodiments, strut 717 may be omitted from the apparatus or the height of injector frame 701 may be adjustable in another fashion, or may not be adjustable. In still other embodiments, the depth that viscous fertilizer 201 is injected below the surface of the soil 101 may not be adjustable or may be adjustable by varying mounting apparatus 703.

Figure 2:
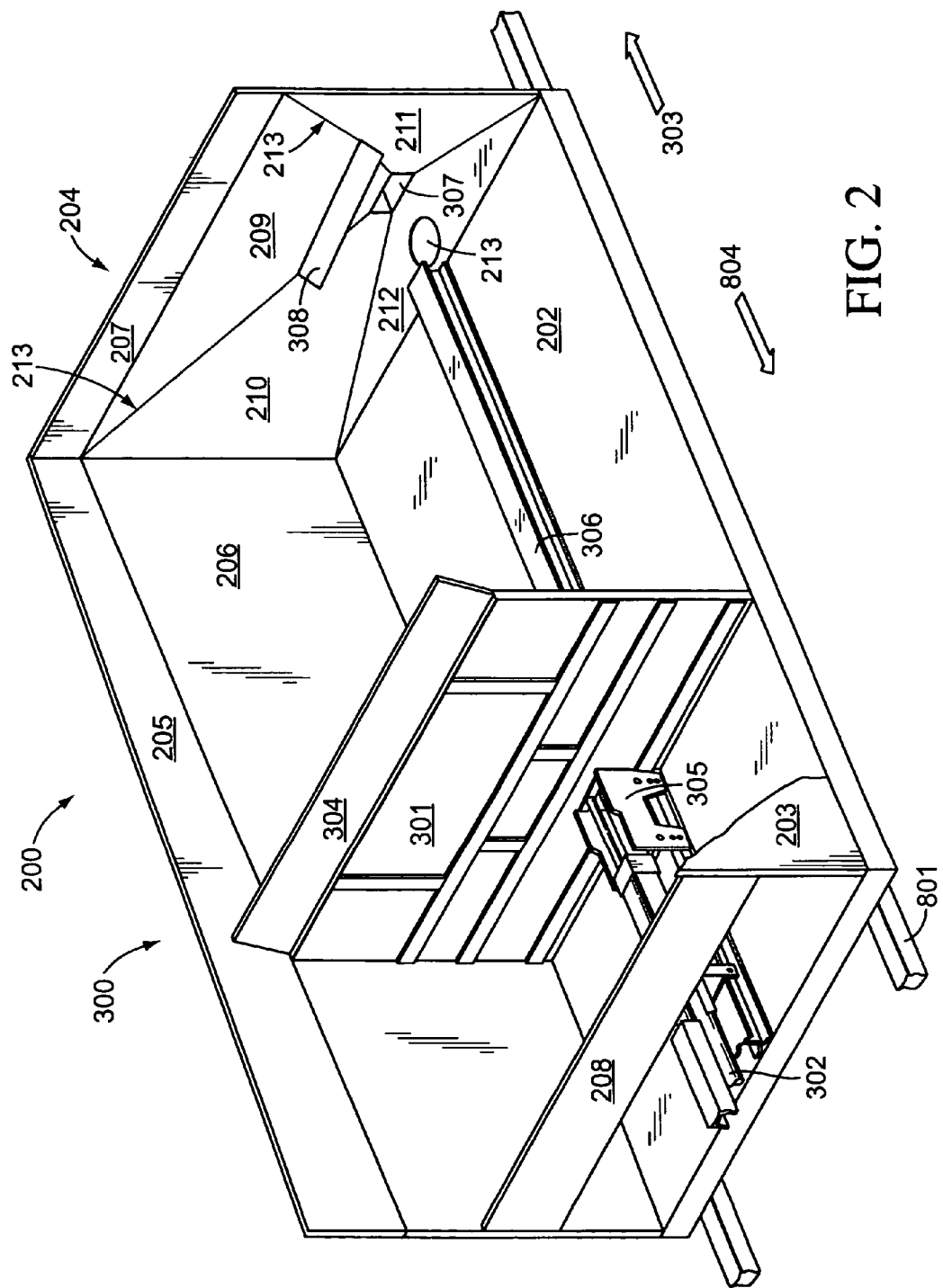

FIG. 2 depicts the interior of container box 200 of a typical embodiment of the apparatus, and the operation of conveying apparatus 300. In this embodiment, container box 200 holds viscous fertilizer 201 (omitted from FIG. 2) and comprises floor 202 mounted on trailer frame 801, left side wall 203 (partially omitted from FIG. 2), right side wall 206, third side wall 204, side wall extensions 205 (partially omitted from FIG. 2), and third side wall extension 207. This embodiment has no fourth sidewall, but merely panel 208 at the forward end of the left and right side walls 203, 206. In this embodiment, push blade 301 and push blade extension 304 serve to keep viscous fertilizer 201 from escaping the forward side of container box 200.

In this exemplary embodiment, conveying apparatus 300 comprises push blade 301 above which is mounted push blade extension 304. Push blade extension 304 is inclined in a rearward direction 303 to help prevent viscous fertilizer 201 from overtopping the push blade. Hydraulic cylinder 302 is powered by and connected to vehicle-mounted hydraulic pump 810 via hydraulic hoses 809 (shown in FIG. 1). In operation, push blade 301 is moved by hydraulic cylinder 302 in a rearward direction 303 (opposite of forward direction 804), thereby pushing the viscous fertilizer toward third side wall 204. The vertical movement of push blade 301 is usefully constrained in some embodiments by shoe 305 which is connected to the push blade and which is slidably fitted to the web of I beam 306 mounted to floor 202, so that the top flange of I beam 306 constrains shoe 305 and the push blade 301 from rising off the floor, but does not constrain forward 804 and rearward 303 movement of push blade 301. The lateral movement of push blade 301 is constrained by left and right side walls 203, 206. An optional rubber flange on the sides and bottom of push blade 301 prevents at least some viscous fertilizer 201 from passing to the forward side 804 of push blade 301. In another embodiment, the vertical movement of push blade 301 is constrained by guides along side walls 203, 206 or by a cover over container box 200.

Third side wall 204 of container box 200 has, in the illustrated embodiment, extension 207 along its top edge and rectangular outlet hole 307 centered along the bottom edge of third side wall 204. In other embodiments, outlet hole 307 may be of other shapes and orientations. The plane of the entrance to outlet hole 307 is offset behind the surface defined by the rearmost edges of side walls 203, 206 and floor 202. Third side wall 204 has facets 209, 210, 211 (also illustrated in FIG. 3) which accommodate the offset. Facet 209 is inclined from the vertical to slope down and rearward 303 from the top edge of rear wall 204 to the top of outlet hole 304. The other facets 210, 211 are vertical but slanted from the rear edge of right and left side walls, respectively 206, 203, to the right and left edges of outlet hole 307. The intersection of these facets define inclined, diagonal, obtuse corners 213. Floor extension 212 is coplanar with floor 202 and extends behind floor 202 to the bottom of outlet hole 307. Through this floor extension is an optional circular clean-out hole 213 which is closed during operation of apparatus 100 but which may be opened to allow access. In another embodiment, third side wall 204 may be conically shaped rather than faceted, or may be comprise facets and curved surfaces. The location of outlet hole 307 within the third side wall may be varied, or it may be located in the floor 202, floor extension 207, or it may span several surfaces that make up container box 200.

As viscous fertilizer 201 is pushed rearward in operation by push blade 301, the facets 209, 210, 211 of third side wall 204 direct viscous fertilizer 201 toward outlet hole 307 in third side wall 204 which is connected to pump 400.

Above outlet hole 307 in this embodiment, baffle 308 is attached to third side wall 204 about one-third of the distance from floor extension 202 to the top of third side wall 204. When hydraulic cylinder 302 is operated so slowly as to move less viscous fertilizer 201 toward outlet hole 307 than pump 400 draws out of container box 200 through outlet hole 307, a hole may form in the surface of viscous fertilizer 201 adjacent to third side wall 204. If this situation continues, the hole may deepen and eventually reach outlet hole 307, thereby disrupting the continuous flow of viscous fertilizer to pump 400 and thereafter below the surface of the soil. Baffle 308 usefully delays the onset of this adverse operational condition by allowing the pump to draw viscous fertilizer into outlet hole 307 from an area of container box 200 which is not adjacent to third side wall 204. In other embodiments, the baffle may be omitted. In still other embodiments, floor extension 212 may be extended laterally so as to increase the degree of inclination from the vertical of center facet 209, or may not coplanar with the floor 202. Excessive of inclination of center facet 209 may result in a large volume of viscous fertilizer 201 that cannot be removed from container box 200 through use of conveying apparatus 300.

In another embodiment, outlet hole 307 is located in floor extension 212 with pump 400 moved to accommodate the position of outlet hole 307 or a conduit added to carry viscous fertilizer 201 from outlet hole 307 to pump 400.

Figure 3:
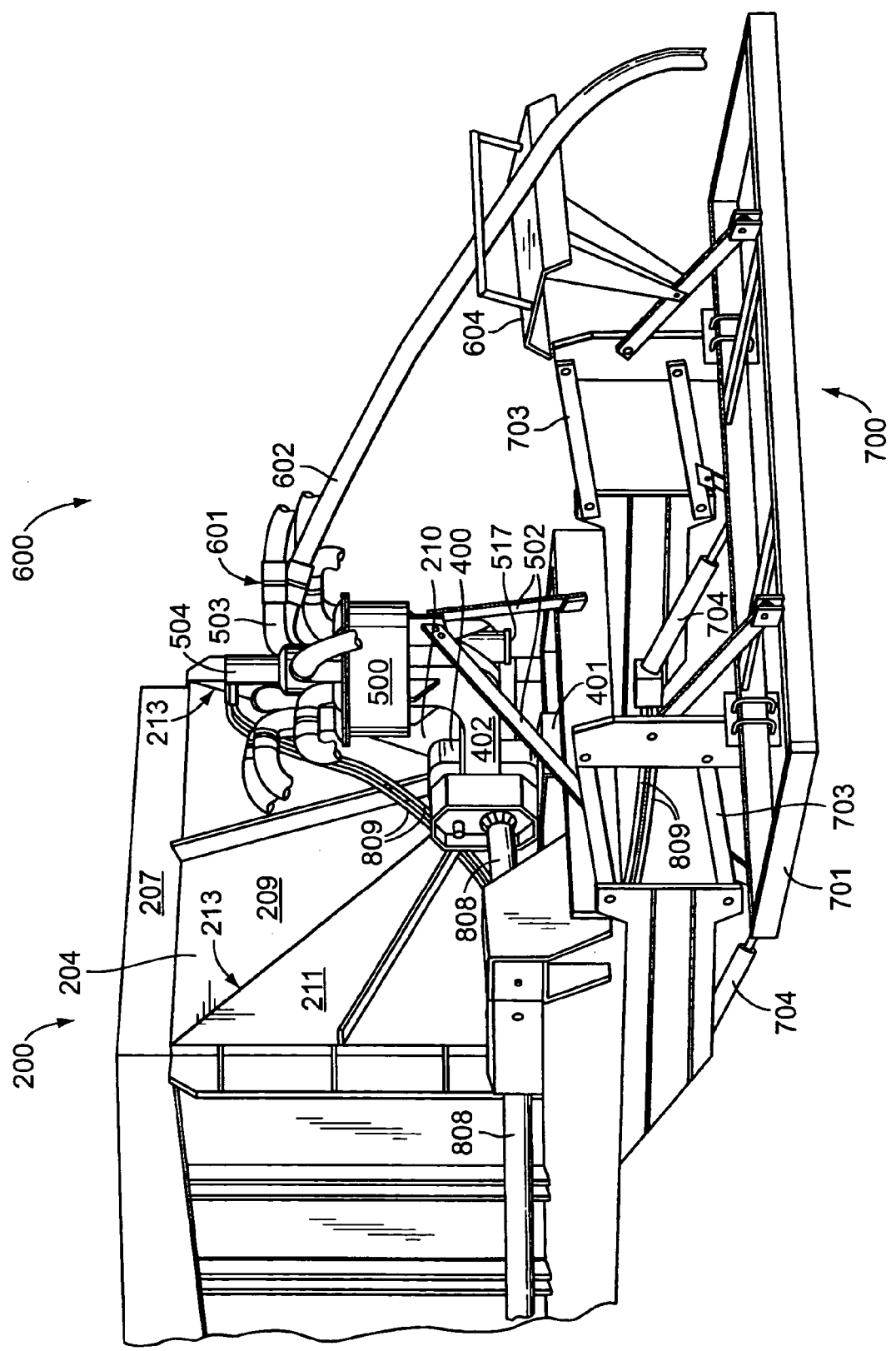

FIG. 3 depicts the rear of container box 200, pump 400, and proportioner 500 of a typical embodiment. In this embodiment, third wall 204 is comprised of three facets, 209, 210, 211, forming corners 213, and top extension 207. Pump 400 is mounted on platform 401 attached to trailer frame 801. The pump inlet located on the forward side of pump 400 is connected to the rear of outlet hole 307 (shown in FIG. 2). The pump is powered by power take off shaft 806 of vehicle 803 (shown in FIG. 1) which is transmitted to the pump through power take off shaft 807 and gears and shafts 808. Ppump 400 is usefully a positive displacement, rotary lobe pump, VL series manufactured by Jurop, Inc. In other embodiments, the pump may be of another types, including but not limited to positive displacement pumps such as piston or ram pumps.

Pump 400 is typically capable of pumping viscous fertilizer 201 at a pressure of at least 40 p.s.i. In operation of the embodiment depicted in FIG. 1 with viscous fertilizer 201 consisting of dewatered biosolids with 30% solid content by weight, pressures may vary from 100 to 130 p.s.i. at conduit 402 (shown in FIG. 3). The preferred pressure generally increases with the viscosity or solid content of viscous fertilizer 201. The preferred pressure also depends upon the number of injectors 711 (shown in FIG. 4), the size and pressure capacity of delivery system 600, and the configuration of proportioner 500.

With further reference to the embodiment illustrated in FIG. 3, from the outlet at the rearward side 303 of pump 400, pressurized viscous fertilizer 201 enters conduit 402, which is in this embodiment of rectangular cross section approximately 6 inches by 9 inches. The cross sectional size and shape of conduit 402 may be changed depending upon the capacity and position of pump 400 and proportioner 500. Conduit 402 leads rearward and curves up vertically to enter proportioner 500. In another embodiment, proportioner 500 is located immediately adjacent to pump 400 such that conduit 402 is unnecessary.

Figure 6:
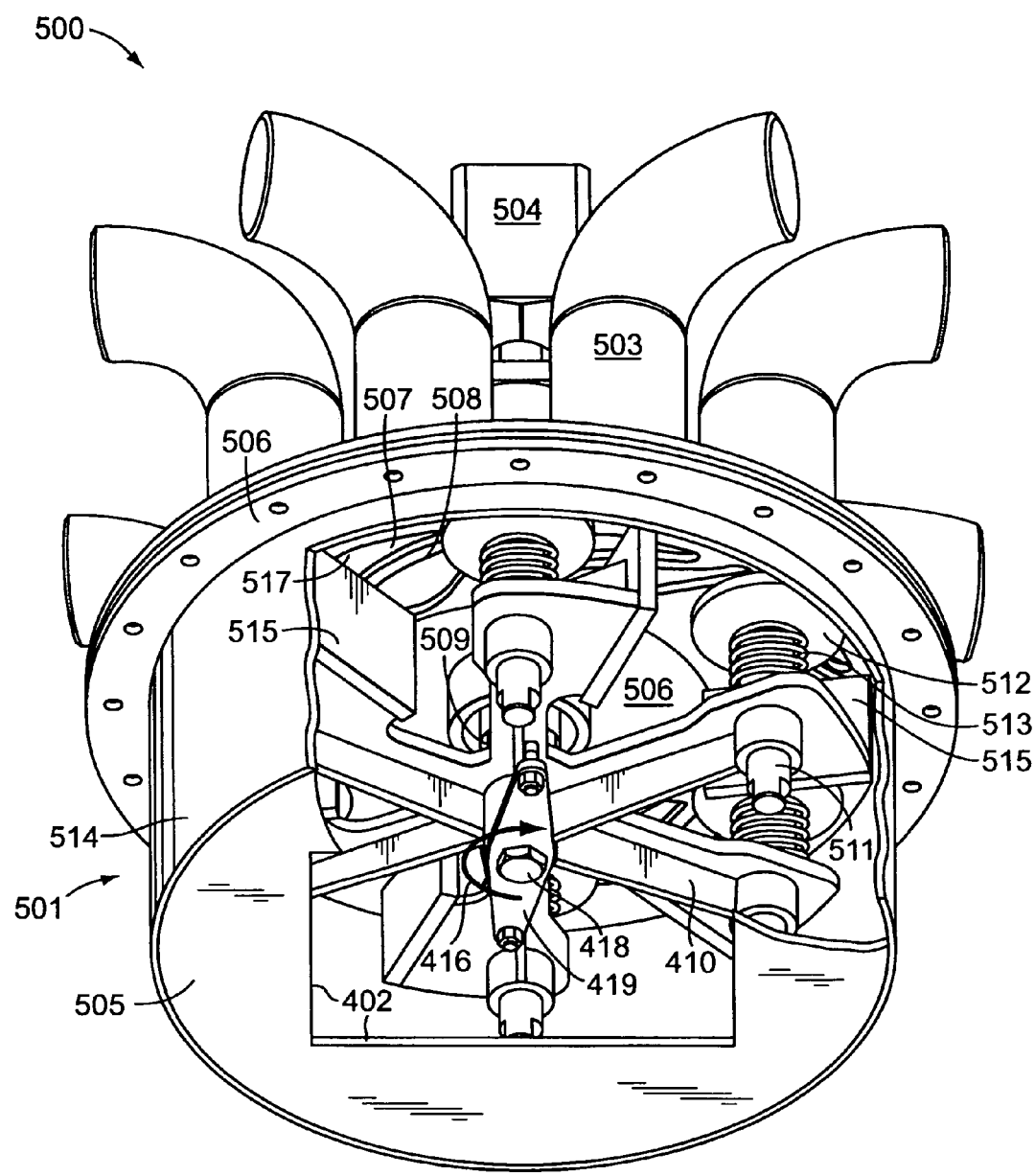
FIG. 6 is a partially cutaway view of proportioner 500 without viscous fertilizer inside, viewed from the bottom left side.

Referring to the particular embodiment depicted in FIG. 6, propotioner 500 comprises chamber 501 comprising a top plate 506, a bottom plate 505, and a cylindrical wall 514, which is supported by struts 502 attached to trailer frame 801 (shown in FIG. 3). An opening through bottom plate 505 is in communication with conduit 402. An optional wear plate 517 shaped as an annulus is mounted upon the bottom face of top plate 506. Through top plate 506 and wear plate 517 are nine outlet ports 507 which are in communication with nine pipes 503 which lead vertically up and curve over horizontally. Outlet ports 507 are distributed axisymmetrically about top plate 506 and wear plate 517. Outlet ports 507 are, in this embodiment, teardrop shaped with sigmoidal bars 508 across their centers. Motor 504 is mounted above chamber 501 and is in communication with shaft 509, which is coaxial with chamber 501 and which passes through top plate 506 so as to prevent the escape of viscous fertilizer from the interior of chamber 501. Motor 504 turns shaft 509 in a counterclockwise direction 516 viewed from the top. Six axisymmetrical horizontal arms 510 are rigidly attached to shaft 509 within chamber 501 by a bolt 518 coaxially threaded into the bottom of shaft 509 and by a locking bar 519 whose ends are bolted into arms 510 so as to prevent bolt 518 from unscrewing when shaft 509 rotates. In other embodiments, other methods well known in the art may be used to attach arms 510 to shaft 509. Rod 511 is slidably fitted into a vertical hole near the outside end of arm 510 such that rod 511 may slide vertically. Puck 512 is mounted atop rod 511. Puck 512 is a squat cylinder with a planar top surface oriented parallel to the bottom face of wear plate 517. Compression coil spring 513 mounted on rod 511 biases the top surface of puck 512 flat against wear plate 517. Scraper 515 may be optionally mounted to arm 510 such that, when shaft 509 turns in direction 516, the top edge of scraper 515 precedes puck 512 across wear plate 517 over each outlet port 507.

In other embodiments of proportioner 500, chamber 501 may have other orientations. Wall 514 and may be in the shape of a prism, or a combination of portions of a prism or cylinder. Shaft 509 may turn in the other direction. The number of outlet ports 507 with corresponding pipes 503 may be more or less. Similarly, the number of arms 510, rods 511, pucks 512, and springs 513 may be more or less. In another embodiment, pipes 503 may be of a different shape or eliminated such that delivery system 600 is connected directly to cylindrical chamber 501.

In operation of the embodiment shown in FIG. 6, viscous fertilizer 201 is introduced into chamber 501 through conduit 402 under pressure. Hydraulic motor 504 is connected to hydraulic hoses 809 from the hydraulic pump 810 on the vehicle 803 (shown in FIG. 1). In other embodiments, motor 504 may be powered differently, such as by a power take off shaft, an engine, or electrically. Motor 504 rotates shaft 509, arm 510, rod 511, puck 512, spring 513, scraper 515, bolt 518, and locking bar 519 (together, the "rotating parts") in direction 516 at a speed of approximately 380 revolutions per minute. As puck 512 rotates, it alternately exposes and covers portions of outlet port 507 such that the flow of viscous fertilizer 201 out of chamber 501 through each outlet port 507 is alternately allowed and restricted. By periodically restricting the flow from each outlet port 507, either completely or substantially, proportioner 500 substantially reduces any variation in flux through each outlet port 507 which might occur due to the geometry of the proportioner, variations in the viscosity of viscous fertilizer 201, gravity, variation in the length of and friction associated with the components of the delivery system 600 for each outlet port 507, etc.

In other embodiments of proportioner 500, bias may be applied to puck 512 through a torsion or planar spring. In yet other embodiments, arm 510 may be hinged to the shaft 509, and the bias may be applied to the entire arm. In yet other embodiments, the rotating parts may be replaced with a rotating disk which lies flat against the bottom surface of wear plate 517. This disk has solid areas and open areas (such as holes) which alternately cover and expose portions of each outlet port 507 as the disk spins, in the same manner as pucks 512 in the embodiment shown in FIG. 6.

Proportioner 500 additionally serves as a macerator and apparatus to break up solid clumps within viscous fertilizer 201 and to prevent solid clumps from clogging delivery system 600 and injector mechanism 700. This is accomplished in three ways. First, the vertical orientation of proportioner 500, with top plate 506 above bottom plate 505 and walls 504 oriented vertically, allows relatively dense contaminants in viscous fertilizer 201, such as rocks or pieces of metal, to collect on bottom plate 505 rather than pass out through the outlet ports 507. A clean-out hole 517 (shown in FIG. 3) is provided. Second, the spinning of the rotating parts tends to mix viscous fertilizer 201 to make sure any clumps within are fully wetted and macerated. Third, the bias of pucks 512 against wear plate 517 and their motion across outlet ports 507 serves to shear off any clumps that may remain in viscous fertilizer 201. In this respect, the teardrop shape of outlet ports 507 with the converging sides of the teardrop oriented in direction of rotation 516 tends to hold any clumps in place so that that shearing force of puck 512 may be applied. In addition, sigmoidal bars 508 create two sets of converging sides with which puck 512 may interact to shear clumps. Optional Scrapers 515 serve much the same purpose but may protect pucks 512 from damage which might otherwise affect the pucks ability to seal outlet ports 507. However, the maceration and anti-clogging functions of proportioner 500 may be omitted from other embodiments, which may have outlet ports 507 of any shape, may omit sigmoidal bars 508, may omit slidably fitted rods 511 and springs 513, may omit scrapers 515, or may have other orientations.

The pressure of viscous fertilizer 201 maintained in delivery system 600 is, in part, dependent upon the relative cross sectional area of conduit 402 and the sum of the cross sectional areas of all outlet ports 507 minus the amount of those areas covered by pucks 512. Thus, to maintain a desired pressure of viscous fertilizer 201 which may facilitate its movement through delivery system 600, different embodiments may vary the number of outlet ports 507 or vary the number of pucks 512 (with corresponding different numbers of arms 510, bars 511, springs 513, and scrapers 515). One such embodiment, reflected in the embodiment in FIGS. 1-6 and 7e, uses viscous fertilizer 201 comprising dewatered biosolids with 30% solids content, approximately 100-130 p.s.i. pressure in conduit 402, a cross sectional area of conduit 402 of about 54 square inches (6 inches by 9 inches), six arms 510 and pucks 512, and an exposed cross sectional area of the exposed outlet ports 507 of approximately 30 to 33 square inches (nine ports of about 7 square inches each, about half of which area is blocked at any one time).

It is preferred that the pressure in delivery system 600 remain nearly constant in order that the rate of injection of viscous fertilizer below the surface of the soil remain constant, and thus the amount of nutrients injected per acre be uniform. Some variation in pressure is sometimes desirable, however, as it may help clear any potential any clogs that may form in delivery system 600. To maintain a constant pressure, it is desirable that the total cross sectional area of outlet ports 507 exposed (that is, not covered by pucks 512) remain nearly constant throughout the entire rotation of the rotating parts relative to the outlet ports. In the exemplary embodiment illustrated in FIG. 7a, this is accomplished by four circular outlet ports 507 arranged axisymmetrically through top plate 506 and with puck 512 shaped as the portion of an annulus subtending a 90 degree angle, such that as the puck rotates about the axis of shaft 509 in direction 516, the trailing edge of puck 512 begins to expose one outlet port just as the leading edge of puck 512 begins to cover the adjacent outlet port. In this embodiment, the sum of areas of outlet ports 507 which are uncovered equals the area of three outlet ports, regardless of where puck 512 is in its rotation about shaft 509. Outlet ports 507 need not be circles, but can be of any shape, and the number of ports and pucks may vary. In the exemplary embodiment illustrated in FIG. 7b, for example, four star-shaped outlet ports and two pucks are present. In this embodiment, the area of two stars is left uncovered at all times during the rotation of the pucks. Where outlet ports 507 are not circular, pipes 503 may have a cross section that conforms to the shape of outlet ports 507, may remain circular and circumscribe outlet ports 507, or may be belled out so as to cover outlet ports 507 but have a circular cross section through most of their length, as show in FIG. 3. Pipes 503 need not remain of constant cross section, but may vary so as, for example, to become of circular cross section where fitting 601 (Shown in FIG. 3) occurs. In the exemplary embodiment illustrated in FIG. 7c, outlet ports 507 subtend angles with respect to shaft 509 which are greater than 360 degrees divided by the number of outlet ports (here, 90 degrees), and thus outlet ports 507 radially overlap one another. In the exemplary embodiment illustrated in FIG. 7d, puck 512 is not shaped as a portion of an annulus, and the total area of outlet ports 507 not covered by puck 512 may vary, slightly, as puck 512 rotates about shaft 509.

Figure 7A:
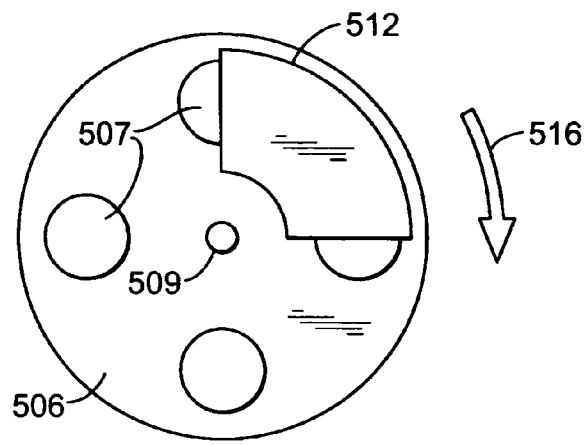
Figure 7B:
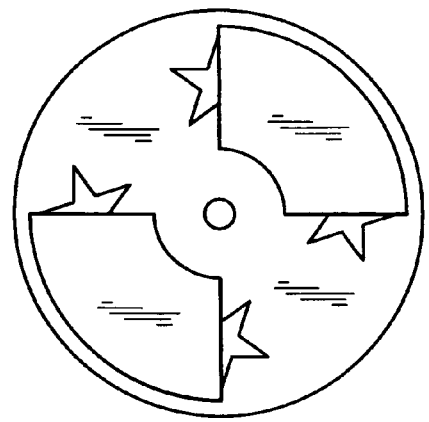
Figure 7C:
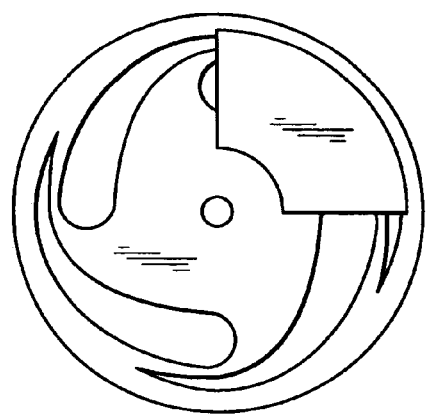
Figure 7D:
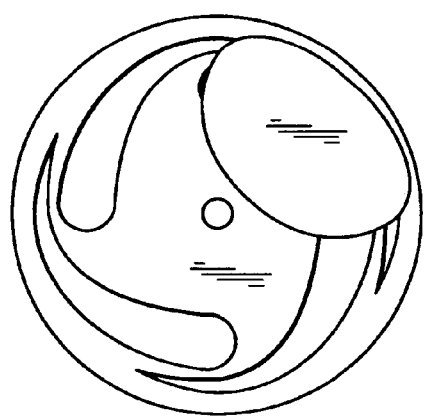
Figure 7E:
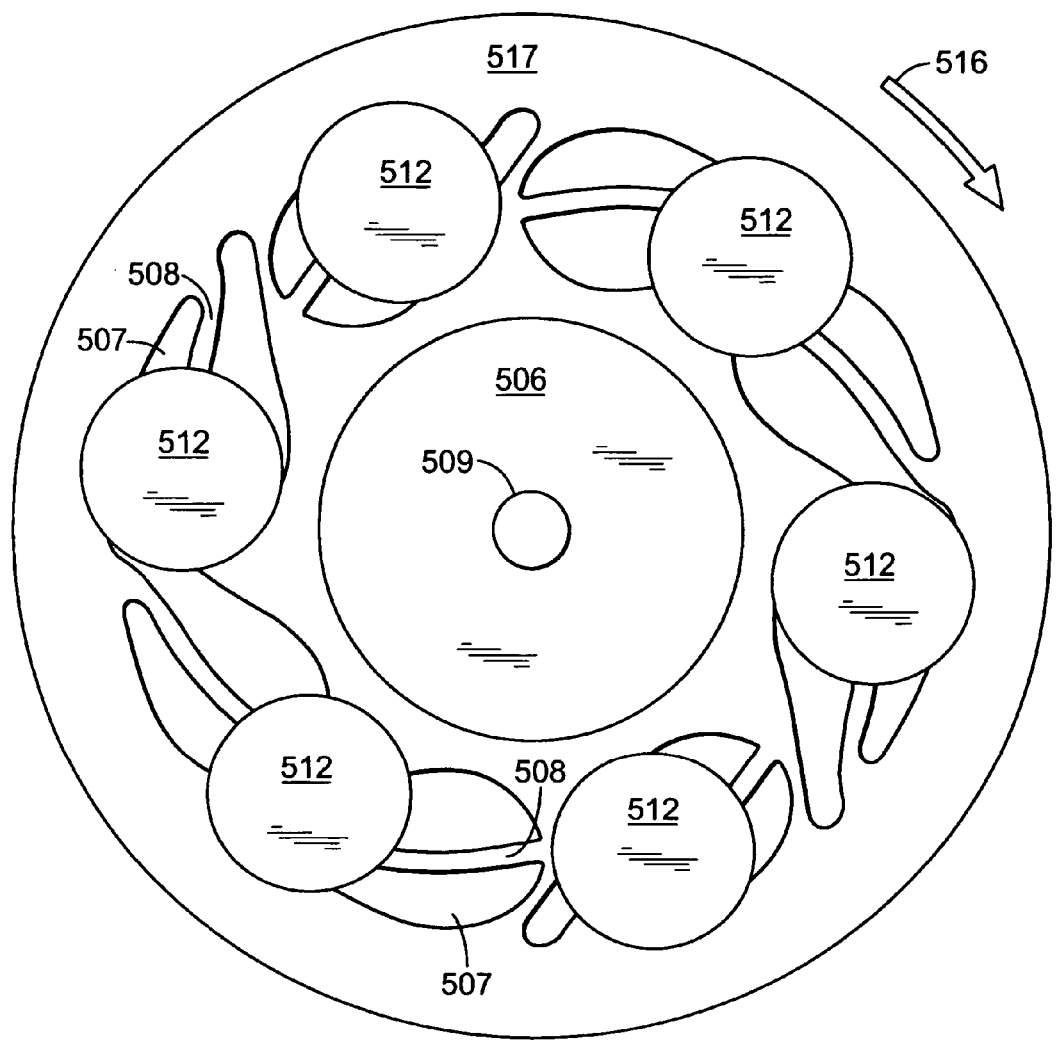

In yet other embodiments, the number of outlet ports 507 may be either more or less, and the number of pucks 512 may be greater than one. In FIG. 7e, nine outlet ports 507 are arranged axisymmetrically through top plate 506 about shaft 509. Each outlet port 507 has teardrop shape which subtends an angle with respect to shaft 509 which is greater than 40 degrees (i.e., 360 degrees divided by 9) and which overlaps the adjacent outlet port. Three circular pucks 512 each subtend an angle of slightly greater than 40 degrees The radial extent of puck 512 is greater than the radial extent of outlet port 507 such that puck 512 has both a radially inner portion and a radially outer portion in contact with the bottom face of wear plate 517 throughout the entire rotation of the rotating parts relative to top plate 506 and wear plate 517. This permits a greater bias pressure to be applied to each puck 512 by spring 513 without puck 512 catching on the lip of outlet port 507. Bar 508, whose bottom surface is coplanar with the bottom face of wear plate 517, also helps serve the same function.

Referring again to FIG. 3, delivery system 600 comprises fitting 601 on each of nine pipes 503 which seals each pipe 503 to the upper end of flexible hose 602 for delivering the pressurized viscous fertilizer 201 to injection mechanism 700. The lower ends of delivery hoses 602 are similarly connected to tubular injector 711 by another fitting 603 (shown in FIG. 4). Fittings 601, 603 permit hoses 602 to be removed from pipes 503 and tubular injectors 711 for cleaning. Flexible hoses 602 are supported from collapsing or kinking by support tray 604 which is attached to injector frame 701. In other embodiments, the delivery system may comprise piping without hose, hosing without pipes, with or without support tray 604. In still other embodiments, another type of conduit, such as a channel, may be substituted for some or all of pipes 503 or flexible hoses 602 or both.

Usefully, injection mechanism 700, may be disengaged from the surface of the soil 101 by hydraulic cylinder 704. When actuated, cylinder 704 raises parallel linkage 703 which connects injector frame 701 to trailer frame 801. Hydraulic cylinder 704 is powered by hydraulic pump 810 on vehicle 803 (shown in FIG. 1) via hydraulic hoses 809. In other embodiments, injection apparatus 700 may be moved by a different mechanical connection well known in the art. Parallel linkage 703 or another mechanical connection may be powered by a hydraulic cylinder 704 or by a manual crank, an engine, a power take off apparatus, or electrically.

Figure 4:
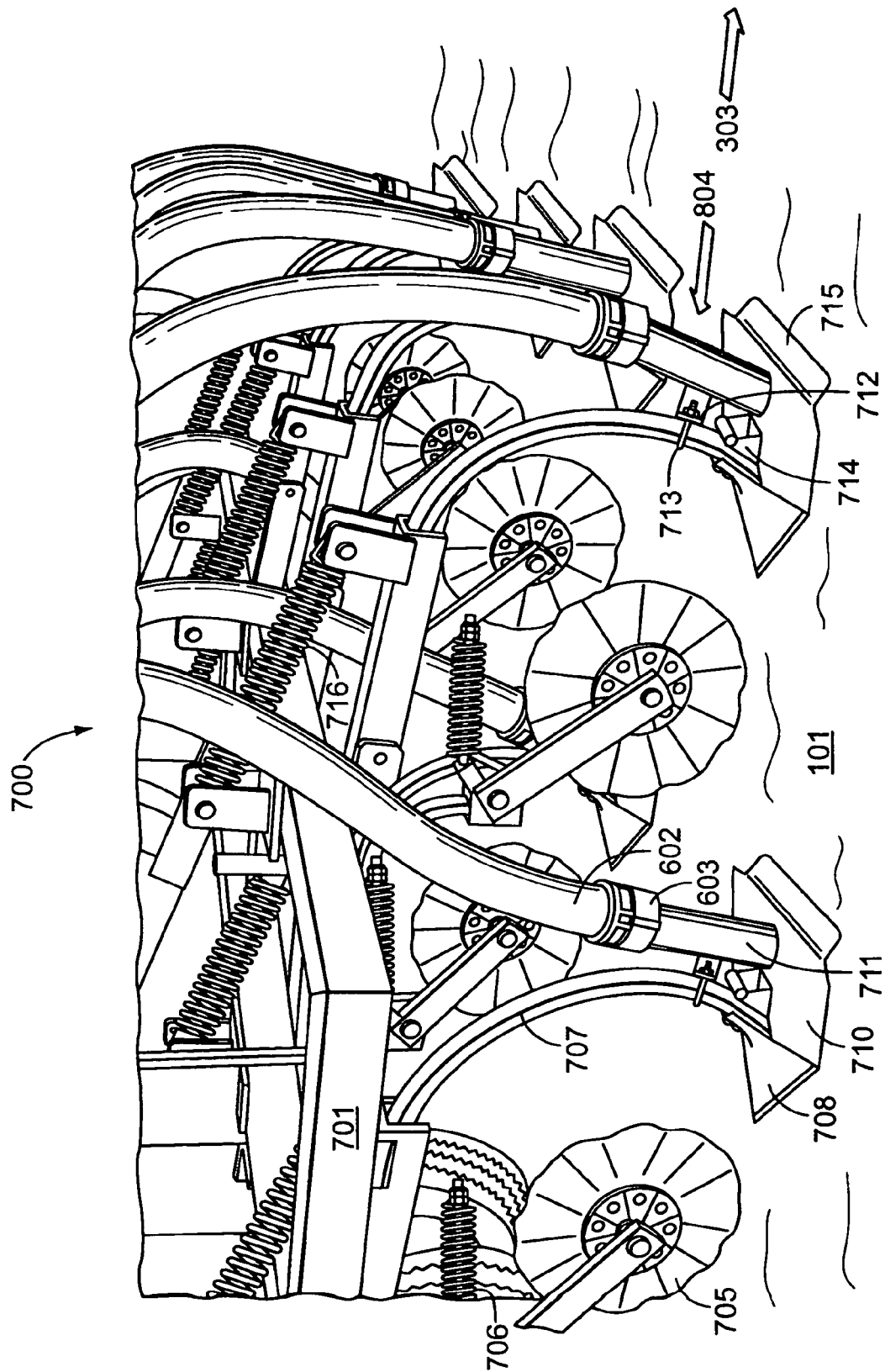
FIG. 4 is a perspective view of injection mechanism 700 of an exemplary embodiment viewed in a disengaged position (i.e., raised above the surface of the soil 101) viewed from the left rear side of the embodiment. Some repeated portions of the injection mechanism have been omitted for clarity.

FIG. 4 depicts injection mechanism 700 of the illustrated embodiment viewed in a disengaged position (i.e., raised above the surface of the soil 101), as viewed from the left rear side of the embodiment. Plow frame 701 is mounted onto trailer frame 801 by parallel linkage 703, shown in FIG. 3.

In the embodiment illustrated, a series of nine coulters 705 are mounted onto injector frame 701, arranged parallel to forward direction 804 and arranged to cut through any stubble into the surface of the soil 101 when apparatus 100 is moved in the forward direction 804. Coulters 705 are mounted in two rows alternating front and rear, with hinges and springs 706 biased such that when coulter 705 hits a large rock or similar obstruction, it is deflected backwards, and then sprung back into position when the obstruction is passed. In another embodiment, coulter 705 is held in position by shear fittings, or rigidly attached to injector frame 701. Coulters 705, springs 706, and their arrangement and operation are well known in the art. In another embodiment, the coulters and springs are omitted. In another embodiment, the relative location of the coulters is changed to a single row, a chevron, or another arrangement.

Also mounted onto injector frame 701 in this embodiment are a series of nine shanks 707 with hinges and springs 716 arranged to follow coulters 705 when apparatus 100 is moved in forward direction 804. The embodiment in FIG. 4 shows C-tine shanks, but in other embodiments, S-tine shanks, straight-tine shanks, or other types of shanks well known in the art may be used. Hinges and springs 716 are biased such that when shank 707 hits a large rock or similar obstruction, it is deflected in a rearward direction 303 and then sprung back into position when the obstruction is passed. In another embodiment, shanks 707 are held in position by shear fittings, or rigidly attached to injector frame 701. Shanks 707, hinges and springs 716, and their arrangement and operation are well known in the art. Sweep point 708 is mounted onto the lower end of each shank 707 with bolts 709 (shown in FIG. 5).

Shanks 707, springs 716, sweep points 708, bolts 709, and their arrangement are well known in the art.

Behind each sweep point 708, in typical embodiments, is extension plate 710 which is oriented parallel to the surface of the soil 101. Through the extension plate is a hole to which tubular injector 711 is butted. Tubular injector 711 extends from extension plate 710 upward to fitting 603 which attaches the top of injector 711 to the flexible hose 602. Each tubular injector 711 is rigidly attached to its corresponding shank 707 by bracket 712 and U-bolt 713. Each extension plate 710 is positioned against shank 707 by flange 714 attached to extension plate 710 and by bolts 709. Tab 715 at the rear of extension plate 710 is inclined downward and rearward. In other embodiments, tubular injector 711 and/or extension plate 710 may be fitted and attached to the shank in another manner, including welding, riveting, bolting, and/or with interlocking flanges. In yet other embodiments, a separate extension plate 710 may be omitted an sweep point 708 may extend in a rearward direction 303 to a point behind injector 711.

Figure 5:
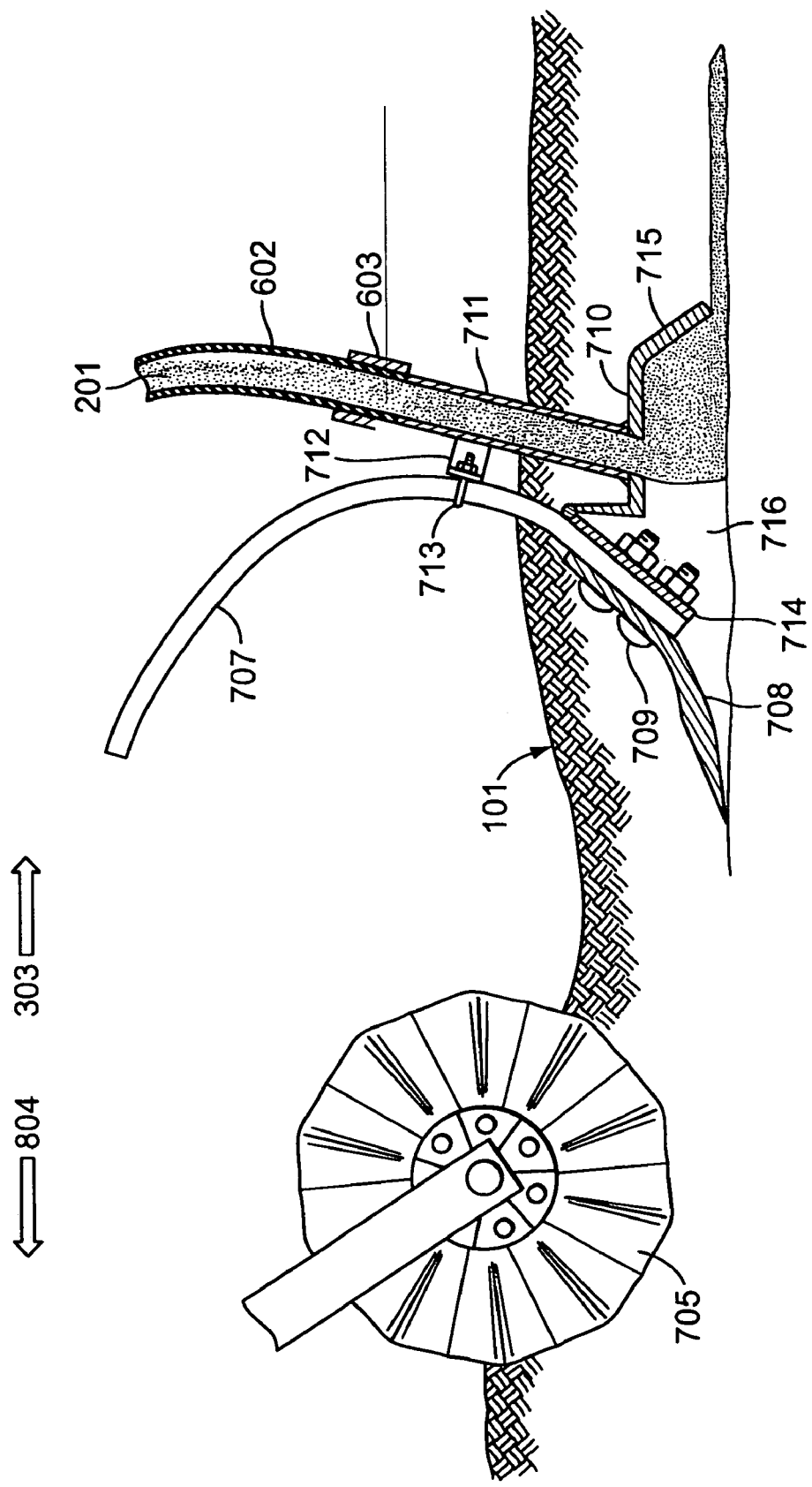
FIG. 5 is a cross section of a portion of injection mechanism 700 in an engaged position.

FIG. 5 is a cross section of a portion of injection mechanism 700 of an exemplary embodiment in operation. As leading vehicle 803 pulls apparatus 100 (shown in FIG. 1) in forward direction 804, coulters 705 cut through any stubble into the surface of the soil ahead of shanks 707. Sweep points 708 form voids 716 below the surface of the soil 101 which is maintained to the rear 303 of sweep points 708 by extension plate 710. Pressurized viscous fertilizer 201 enters tubular injector 711 and is injected into void 716 under extension plate 710. As injection mechanism 700 passes, tabs 715 limit the thickness of the viscous fertilizer left below the surface of the soil 101 and encourages viscous fertilizer 201 to spread transversely across void 716. In other embodiments, injectors 711 may extend through extension plate 710 into void 716. In other embodiments, the lower (nozzle) ends of injectors 711 may have a different shape, such as a fan shape oriented transverse to the forward direction 804, to enable viscous fertilizer 201 to be further spread transversely across void 716.

In other embodiments, a different point shape may be used, including but not limited to narrower sweep points 708, chisel points, or knife points, and/or the width of extension plate 710 may be narrowed, such that operation of apparatus 100 results in less tilling of the soil surface; however, these embodiments generally result in smaller voids 716 which may limit the amount of viscous fertilizer 201 that may be injected below the surface of the soil 101. In another embodiment, a chisel point may be used and extension plate 710 eliminated, such that injector 711 is mounted to shank 707 such that the lower end of injector 711 terminates below the surface of the soil 101 behind shank 707, in which case viscous fertilizer 201 would be injected in a vertical slit cut by the chisel point and shank 707, the depth of which depends in part upon the relative vertical position of the lower end of injector 711 to the lower end of shank 707 and the chisel point.

All publications, patents, patent applications and other documents cited in this application are hereby incorporated by reference in their entireties for all purposes to the same extent as if each individual publication, patent, patent application or other document were individually indicated to be incorporated by reference for all purposes.

While various specific embodiments have been illustrated and described, it will be appreciated that various changes can be made without departing from the spirit and scope of the invention(s).

What is claimed is:

1. An apparatus for injecting viscous fertilizer below the surface of the soil, comprising:
   (a) a container box that is upwardly open; wherein said container box has at least a first, second, and third side wall, said third side wall having an outlet hole through which said viscous fertilizer may pass outside said container box;
   (b) means for conveying said viscous fertilizer from said container box, comprising
      (1) a push blade disposed so as to prevent said viscous fertilizer from escaping said apparatus from the side of said container box opposite said third side wall; and
      (2) a means for moving said push blade at least partially within said container box toward said third side wall to effect exit of contained viscous fertilizer through said outlet hole;
   (c) pumping means for receiving said viscous fertilizer from said containing means via said conveying means and for displacing said viscous fertilizer under pressure;
   (d) proportioning means for receiving said viscous fertilizer from said pumping means under pressure and distributing said viscous fertilizer into at least one outlet port under pressure;
   (e) delivery means for moving said viscous fertilizer from said outlet ports under pressure; and
   (f) injection means for receiving said viscous fertilizer from said delivery means and injecting said viscous fertilizer below the surface of the soil as said injection means is moved in a forward direction;
   wherein said third side wall additionally comprises one or more surfaces obliquely facing said push blade so as in operation to direct said viscous fertilizer toward said outlet hole.

2. An apparatus for injecting viscous fertilizer below the surface of the soil, comprising:
   (a) a container box that is upwardly open; wherein said container box has at least a first, second, and third side wall, said third side wall having an outlet hole through which said viscous fertilizer may pass outside said container box;
   (b) means for conveying said viscous fertilizer from said container box, comprising
      (1) a push blade disposed so as to prevent said viscous fertilizer from escaping said apparatus from the side of said container box opposite said third side wall; and
      (2) a means for moving said push blade at least partially within said container box toward said third side wall to effect exit of contained viscous fertilizer through said outlet hole;
   (c) pumping means for receiving said viscous fertilizer from said containing means via said conveying means and for displacing said viscous fertilizer under pressure;
   (d) proportioning means for receiving said viscous fertilizer from said pumping means under pressure and distributing said viscous fertilizer into at least one outlet port under pressure;
   (e) delivery means for moving said viscous fertilizer from said outlet ports under pressure; and
   (f) injection means for receiving said viscous fertilizer from said delivery means and injecting said viscous fertilizer below the surface of the soil as said injection means is moved in a forward direction;
   wherein said apparatus additionally comprises a baffle protruding from said third side wall above said outlet hole, said baffle oriented such that its longitudinal axis is parallel with said floor and with said third side wall.

3. An apparatus for injecting viscous fertilizer below the surface of the soil, comprising:
(a) a container box that is upwardly open; wherein said container box has at least a first, second, and third side wall, said third side wall having an outlet hole through which said viscous fertilizer may pass outside said container box;
(b) means for conveying said viscous fertilizer from said container box, comprising
(1) a push blade disposed so as to prevent said viscous fertilizer from escaping said apparatus from the side of said container box opposite said third side wall; and
(2) a means for moving said push blade at least partially within said container box toward said third side wall to effect exit of contained viscous fertilizer through said outlet hole;
(c) pumping means for receiving said viscous fertilizer from said containing means via said conveying means and for displacing said viscous fertilizer under pressure;
(d) proportioning means for receiving said viscous fertilizer from said pumping means under pressure and distributing said viscous fertilizer into at least one outlet port under pressure;
(e) delivery means for moving said viscous fertilizer from said outlet ports under pressure; and
(f) injection means for receiving said viscous fertilizer from said delivery means and injecting said viscous fertilizer below the surface of the soil as said injection means is moved in a forward direction;
wherein the top edge of said first and second side walls slope up toward said third side wall.

4. An apparatus for injecting viscous fertilizer below the surface of the soil, comprising:
(a) means for containing viscous fertilizer;
(b) means for conveying said viscous fertilizer from said containing means;
(c) pumping means for receiving said viscous fertilizer from said containing means via said conveying means and for displacing said viscous fertilizer under pressure;
(d) proportioning means for receiving said viscous fertilizer from said pumping means under pressure and distributing said viscous fertilizer into at least one outlet port under pressure, wherein said proportioning means comprises:
(i) a cylindrical chamber with first and second ends for holding said viscous fertilizer under pressure;
(ii) an inlet port through said first end;
(iii) a shaft extending through said second end coaxially with said cylindrical chamber;
(iv) a motor capable of rotating said shaft;
(v) said outlet ports opening through said second end axisymmetrically with respect to said shaft;
(vi) at least one rotatable radial arm disposed inside of said chamber and attached to said shaft; and
(vii) at least one puck connected to said arm wherein one face of said puck is parallel to and in contact with said second end, and wherein at any angle of rotation of said shaft, said puck covers a fraction of the total area of said outlet ports, and wherein at any two angles of rotation of said shaft, said fractions do not differ by more than 20% of the larger;
(e) delivery means for moving said viscous fertilizer from said outlet ports under pressure; and
(f) injection means for receiving said viscous fertilizer from said delivery means and injecting said viscous fertilizer below the surface of the soil as said injection means is moved in a forward direction;
wherein when said viscous fertilizer is introduced into said inlet port under pressure and said motor rotates said shaft, said viscous fertilizer is expelled from said outlet ports.

5. An apparatus for injecting viscous fertilizer below the surface of the soil, comprising:
(a) means for containing viscous fertilizer;
(b) means for conveying said viscous fertilizer from said containing means;
(c) pumping means for receiving said viscous fertilizer from said containing means via said conveying means and for displacing said viscous fertilizer under pressure;
(d) proportioning means for receiving said viscous fertilizer from said pumping means under pressure and distributing said viscous fertilizer into at least one outlet port under pressure, wherein said proportioning means comprises:
(i) a cylindrical chamber with first and second ends for holding said viscous fertilizer under pressure;
an inlet port through said first end;
(iii) a shaft extending through said second end coaxially with said cylindrical chamber;
(iv) a motor capable of rotating said shaft;
(v) said outlet ports opening through said second end axisymmetrically with respect to said shaft;
(vi) a rotatable disk disposed inside of said chamber and coaxially attached to said shaft, such that one face of said disk is parallel to and in contact with said second end; and
(vii) at least one hole, opening, or notch in said disk, wherein at any angle of rotation of said shaft, said disk does not cover a fraction of the total are of said outlet ports, and wherein at any two angles of rotation of said shaft, said fractions do not differ by more than 10% of the larger;
(e) delivery means for moving said viscous fertilizer from said outlet ports under pressure; and
(f) injection means for receiving said viscous fertilizer from said delivery means and injecting said viscous fertilizer below the surface of the soil as said injection means is moved in a forward direction;
wherein when said viscous fertilizer is introduced into said inlet port under pressure and said motor rotates said shaft, said viscous fertilizer is expelled from said outlet ports.

6. An apparatus for injecting viscous fertilizer below the surface of the soil, comprising:
(a) means for containing viscous fertilizer;
(b) means for conveying said viscous fertilizer from said containing means;
(c) pumping means for receiving said viscous fertilizer from said containing means via said conveying means and for displacing said viscous fertilizer under pressure;
(d) proportioning means for receiving said viscous fertilizer from said pumping means under pressure and distributing said viscous fertilizer into at least one outlet port under pressure,
(e) delivery means for moving said viscous fertilizer from said outlet ports under pressure; and
(f) injection means for receiving said viscous fertilizer from said delivery means and injecting said viscous fertilizer below the surface of the soil as said injection means is moved in a forward direction; wherein the injection means comprises:
(i) a injector frame;
(ii) at least one shank attached to said injector frame, each such shank disposed so as to be drawn through the soil when said injection means is moved in a forward direction;

(iii) a plate disposed behind each of said shanks and oriented so as to maintain voids beneath the surface of the soil behind said shanks and beneath at least part of said plate when said injection means is moved in said forward direction; and
(iv) a tubular injector having a top end and a nozzle end disposed behind each of said shanks;

wherein when said viscous fertilizer is introduced under pressure into said top ends of said injectors from said delivery means, it is expelled into said voids through said nozzle ends of said injectors.

7. An apparatus as in claim 6 wherein said shanks have sweep points.

8. An apparatus as in claim 7 wherein said injection means also comprises a coulter disk in front of each of each said shank.

9. An apparatus as in claim 6 wherein said injectors additionally comprise nozzle ends shaped so as to distribute said viscous fertilizer within said voids.

10. An apparatus for creating a pressurized stream of viscous fertilizer comprising:
    (a) an upwardly open container box with at least a first, second, and third side wall, said third side wall having an outlet hole through which said viscous fertilizer may pass outside said container box wherein said third side wall additionally comprises one or more surfaces obliquely facing said push blade so as in operation to direct said viscous fertilizer toward said outlet hole;
    (b) a push blade disposed so as to prevent said viscous fertilizer from escaping said apparatus from the side of said container box opposite said third side wall;
    (c) a means for moving said push blade at least partially within said container box toward said third side wall to effect exit of contained viscous fertilizer through said outlet hole; and
    (d) a pump whose inlet is in communication with said outlet hole.

11. An apparatus for creating a pressurized stream of viscous fertilizer comprising:
    (a) an upwardly open container box with at least a first, second, and third side wall, said third side wall having an outlet hole through which said viscous fertilizer may pass outside said container box;
    (b) a push blade disposed so as to prevent said viscous fertilizer from escaping said apparatus from the side of said container box opposite said third side wall;
    (c) a means for moving said push blade at least partially within said container box toward said third side wall to effect exit of contained viscous fertilizer through said outlet hole;
    (d) a pump whose inlet is in communication with said outlet hole; and
    (e) a baffle protruding from said third side wall above said outlet hole, said baffle oriented such that its longitudinal axis is parallel with said floor and with said third side wall.

12. An apparatus for creating a pressurized stream of viscous fertilizer comprising:
    (a) an upwardly open container box with at least a first, second, and third side wall, said third side wall having an outlet hole through which said viscous fertilizer may pass outside said container box wherein the top edge of said first and second side walls slope up toward the third side wall;
    (b) a push blade disposed so as to prevent said viscous fertilizer from escaping said apparatus from the side of said container box opposite said third side wall;
    (c) a means for moving said push blade at least partially within said container box toward said third side wall to effect exit of contained viscous fertilizer through said outlet hole; and
    (d) a pump whose inlet is in communication with said outlet hole.

* * * * *